Alvin Franklin's
Bucket Holder.
119,024. Patented Sep. 19, 1871.
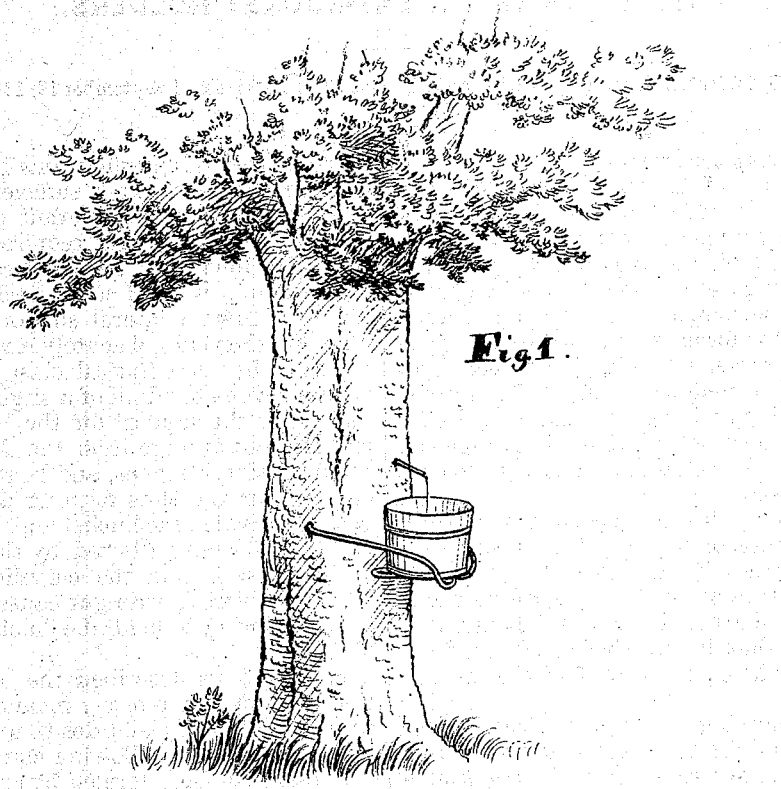
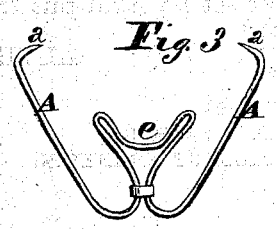
Witnesses,
J. W. Mester
H. A. Daniels
Inventor,
Alvin Franklin by
S. Whitman atty 119,024

UNITED STATES PATENT OFFICE.

ALVIN FRANKLIN, OF GALENA, OHIO.

IMPROVEMENT IN SAP-BUCKET HOLDERS.

Specification forming part of Letters Patent No. 119,024, dated September 19, 1871.

*To all whom it may concern:*

Be it known that I, ALVIN FRANKLIN, of Galena, in the county of Delaware and in the State of Ohio, have invented a new and useful Improvement in Bucket-Holders; and do hereby declare that the following description, taken in connection with the accompanying drawing, hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to that class of devices which is made use of for securing or suspending buckets to trees for the purpose of catching sap; and its nature consists in providing a metallic wire with sharpened ends and bending it in such a form that it furnishes a support for a bucket and acts as a spring to hold the same in position.

In the accompanying drawing, which illustrates my invention and forms a part of the specification thereof, Figure 1 represents the trunk of a tree with my invention applied thereto. Fig. 2 is a side view of the bucket-holder, and Fig. 3 a top view of the same.

The construction, operation, and relative arrangement of the parts constituting my invention are as follows, to wit: The device is constructed of elastic metallic wire and is provided with the prongs or limbs A, which are curved inwardly and sharpened at their extremities $a$ in order that they may be driven into the bark of the tree or fitted into perforations bored for their reception thereon. At a sufficient distance from the bark of the tree to permit of the admission of a bucket of the size required, they are bent obtusely downward and toward each other in the form of a warped curve, and in such a manner as to form a lateral support to the bucket. They are then curved acutely inward and secured together by an elliptical clasp, B, which is of such a size as to admit of a slight lateral motion.

To form the support for the bucket the wires are made to diverge from the clasp at an angle of about sixty degrees, and bent to form the re-entrant curve $e$, thus forming a horizontal surface upon which the bucket may be placed. The lateral movement allowed by the elliptical form of the clasp B and the curvilinear shape into which the wire is wrought causes the arms A to act as a spring to hold the bucket firmly in position.

Having thus described the nature, construction, and operation of my invention, I will indicate what I claim and desire to secure by Letters Patent in the following clause:

A bucket-holder, formed by curving an elastic wire, as shown, for furnishing a horizontal and lateral support for the bucket, as herein described.

In testimony that I claim the foregoing I have hereunto set my hand this 17th day of November, 1869.

ALVIN FRANKLIN.

Witnesses:
   A. M. WELCH,
   ALBERT FRANKLIN.